(12) United States Patent
Xu et al.

(10) Patent No.: US 12,035,098 B2
(45) Date of Patent: Jul. 9, 2024

(54) SMART HEAD-MOUNTED DEVICE

(71) Applicant: Goertek Inc., Shandong (CN)

(72) Inventors: Tongyan Xu, Weifang (CN); Chengxiang Zhai, Weifang (CN)

(73) Assignee: Goertek Inc., Shandong (CN)

( * ) Notice: Subject to any disclaimer, the term of this patent is extended or adjusted under 35 U.S.C. 154(b) by 189 days.

(21) Appl. No.: 17/635,238

(22) PCT Filed: Dec. 26, 2019

(86) PCT No.: PCT/CN2019/128554
§ 371 (c)(1),
(2) Date: Feb. 14, 2022

(87) PCT Pub. No.: WO2021/027228
PCT Pub. Date: Feb. 18, 2021

(65) Prior Publication Data
US 2022/0279269 A1 Sep. 1, 2022

(30) Foreign Application Priority Data
Aug. 14, 2019 (CN) .......................... 201910749786.X

(51) Int. Cl.
*H04R 1/10* (2006.01)
*G02C 11/00* (2006.01)
*H04R 1/40* (2006.01)

(52) U.S. Cl.
CPC .......... *H04R 1/1091* (2013.01); *G02C 11/10* (2013.01); *H04R 1/1041* (2013.01); *H04R 1/403* (2013.01)

(58) Field of Classification Search
CPC ........ H04R 1/10; H04R 1/105; H04R 1/1091; H04R 1/1041; H04R 1/403; G02C 11/10; G02C 5/143
USPC .............................. 381/59, 74, 87, 327, 381
See application file for complete search history.

(56) References Cited

U.S. PATENT DOCUMENTS

| | | | |
|---|---|---|---|
| 6,970,568 B1 * | 11/2005 | Freeman | H04R 29/00 381/59 |
| 10,950,217 B1 * | 3/2021 | Dong | G02B 27/0176 |
| 2022/0416579 A1 * | 12/2022 | David | H02J 50/10 |

FOREIGN PATENT DOCUMENTS

| CN | 109121038 A | 1/2019 |
|---|---|---|
| CN | 110572745 A | 12/2019 |

OTHER PUBLICATIONS

International Search Report dated Apr. 24, 2020 corresponding to International Patent Application No. PCT/CN2019/128554.

* cited by examiner

*Primary Examiner* — William A Jerez Lora
(74) *Attorney, Agent, or Firm* — Baker Botts LLP

(57) ABSTRACT

Disclosed is a smart head-mounted device. The smart head-mounted device comprises a lens and an arm connected to the lens, the same arm being provided with a sound production unit including a first sound production apparatus and a second production apparatus. The first sound production apparatus and a second production apparatus radiate sound waves outward through their respective sound outlets, have opposite phases during operation, and are apart from the same ear hole of a wearer by different distances.

10 Claims, 2 Drawing Sheets

SMART HEAD-MOUNTED DEVICE

CROSS-REFERENCE TO RELATED APPLICATIONS

This application is a National Stage of International Application No. PCT/CN2019/128554, filed on Dec. 26, 2019, which claims priority to Chinese Patent Application No. 201910749786.X, filed Aug. 14, 2019, both of which are hereby incorporated by reference in their entireties.

TECHNICAL FIELD

The present invention relates to the technical field of smart wear, and particularly, involves a smart head-mounted device.

BACKGROUND

The smart head-mounted device usually refers to a smart product which can perform functions such as adding schedules, performing map navigation, interacting with a friend, taking photos, playing audio, playing video, making audio and video calls and other functions through a voice or action, and can realize wireless network access through a mobile communication network.

Existing smart head-mounted device is usually provided with only one speaker, such as an open speaker. The speaker emits sound towards ears of a wearer.

Such speaker, however, has a serious sound leakage, and it is easy for people around to hear the sound from the speaker, which causes as poor privacy of the smart head-mounted device.

Therefore, it is necessary to provide a new technical solution to solve the above-mentioned technical problems.

SUMMARY

An object of the present disclosure is to provide a new technical solution of the smart head-mounted device.

According to a first aspect of the present disclosure, a smart head-mounted device is provided. The smart head-mounted device comprises a lens and an arm connected to the lens, the same arm being provided with a sound production unit including a first sound production apparatus and a second production apparatus; the first sound production apparatus and a second production apparatus radiate sound waves outward through their respective sound outlets, have opposite phases during operation, and are apart from the same ear hole of a wearer by different distances.

Optionally, the sound outlet of the first sound production apparatus is oriented differently from the sound outlet of the second sound production apparatus.

Optionally, the sound outlet of the first sound production apparatus is oriented towards the ear hole of the wearer, and the sound outlet of the second sound production apparatus is oriented away from the wearer.

Optionally, the arm is provided with a cavity therein where the sound production unit is provided, and is provided thereon with a first sound outlet which is in communication with a vibrating part of the first sound production apparatus and a second sound outlet which is in communication with a vibrating part of the second sound production apparatus.

Optionally, the arm comprises a connecting portion and a bending portion connected to one end of the connecting portion, the connecting portion is hinged with the lens at the other end thereof, is provided with a cavity therein, and is formed with a slope towards the ear hole at the one end connected to the bending portion, the first sound outlet being provided on the slope, and the second sound outlet being located on a lateral surface or a top surface of the connecting portion.

Optionally, the first sound production apparatus and the second sound production apparatus respond to the same electrical signal and have opposite polarities.

Optionally, when installed, the first sound production apparatus and the second sound production apparatus have the same polarity, and have electrical signals with opposite polarities.

Optionally, the first sound production apparatus and the second sound production apparatus are of the same model.

Optionally, the distance between the sound outlet of the first sound production apparatus and the sound outlet of the second sound production apparatus is less than or equal to 30 mm.

Optionally, the sound outlet of the first sound production apparatus is towards the ear hole of the wearer, and a distance from the sound outlet of the second sound production apparatus to the ear hole is greater than a distance from the sound outlet of the first sound production apparatus to the ear hole.

Optionally, a difference between the distance from the second sound production apparatus to the ear hole and the distance from the first sound production apparatus to the ear hole is greater than or equal to 5 mm.

Optionally, the sound outlet of the first sound production apparatus, the sound outlet of the second sound production apparatus and the ear hole are located in a line.

According to an embodiment of the present disclosure, since the two sound production apparatuses have opposite phases and the distance between them is much smaller than the distance from the sound production apparatus to the surrounding people, the two sound production apparatuses form an acoustic dipole effect with respect to the surrounding people, and thus when the sound waves of the two sound production apparatuses are transmitted to the ears of the surrounding people, they can be at least partially canceled by each other, thereby significantly reducing the sound leakage phenomenon of the sound production unit.

Besides, since the distances between the two sound production apparatuses and the same ear hole of the wearer are different, for example, the distance difference between the two is greater than or equal to 1 cm, the two will not form an acoustic dipole effect with respect to the wearer, and thus the sound waves are less attenuated near the ear hole, so that the wearer may hear the sound from the sound production unit. This arrangement of the sound production unit improves the privacy of the wearer when listening.

Other features and advantages of the present disclosure will become apparent from the following detailed description of exemplary embodiments of the present disclosure with reference to the accompanying drawings.

BRIEF DESCRIPTION OF THE DRAWINGS

The accompanying drawings, which are incorporated in the description and constitute a part of the description, illustrate embodiments of the present disclosure and, together with the description thereof, serve to explain the principles of the present disclosure.

DETAILED DESCRIPTION

Figure 1:
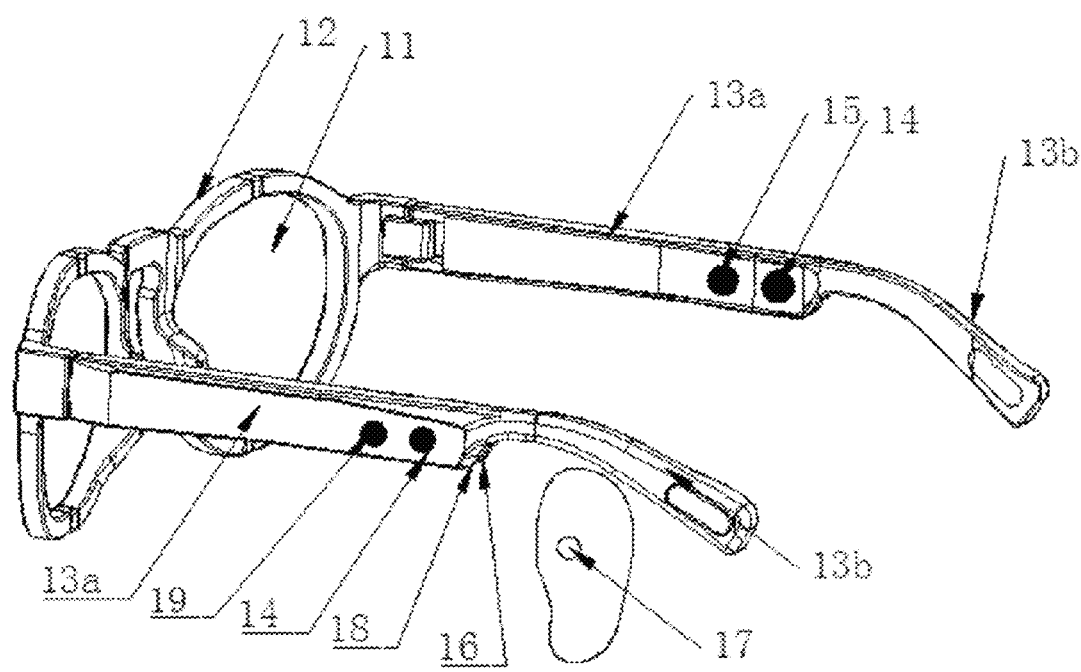
FIG. 1 shows a schematic structural diagram of a smart head-mounted device of the present disclosure.

Various exemplary embodiments of the present disclosure will now be described in detail with reference to the accompanying drawings. It should be noted that the relative arrangement, numerical expressions and numerical values of the components and steps set forth in these examples do not limit the scope of the disclosure unless otherwise specified.

The following description of at least one exemplary embodiment is in fact merely illustrative and is in no way intended as a limitation to the present disclosure and its application or use.

Techniques, methods, and apparatus known to those of ordinary skill in the relevant art may not be discussed in detail but where appropriate, the techniques, methods, and apparatus should be considered as part of the description.

Among all the examples shown and discussed herein, any specific value should be construed as merely illustrative and not as a limitation. Thus, other examples of exemplary embodiments may have different values.

It should be noted that similar reference numerals and letters denote similar items in the accompanying drawings, and therefore, once an item is defined in a drawing, and there is no need for further discussion in the subsequent accompanying drawings.

According to an embodiment of the present invention, a smart head-mounted device is provided. The smart head-mounted device may be smart glasses and the like. As shown in FIG. 1, the smart head-mounted device includes a lens 11 and an arm 12 connected with the lens 11. For example, the arm is directly connected to the edge of the lens 11; or the lens 11 is fixed within the frame 12 and the arm is connected to the frame 12. The smart head-mounted device typically includes two arms. Of course, it is also possible to provide only one arm according to actual needs.

A sound production unit is provided on the same arm. For example, each of the two arms is provided with a sound production unit which is used to emit sound to a wearer. For example, the smart head-mounted device is provided with components such as a power module, a wireless communication module, and a processor which are connected through a PCB. For example, the wireless communication module includes a Bluetooth apparatus, an infrared apparatus, etc., which is used for receiving external wireless signals and sending wireless signals to the outside. The processor is used to process the received wireless signal and convert it into an electrical signal, which is transmitted to the sound production unit through the PCB. The sound production unit converts the electrical signal into an audio signal.

The sound production unit includes a first sound production apparatus 14 and a second sound production apparatus 15 which radiate sound waves outward through their respective sound outlets. One of the sound production apparatuses (for example, the first sound production apparatus 14) is used as a main sound source for producing sound; the other of the sound production apparatus is used as an auxiliary sound source for reducing or even eliminating sound leakage around the wearer to ensure the privacy of wearer.

The first sound production apparatus 14 and the second sound production apparatus 15 may be, but are not limited to, a moving coil speaker, a moving iron speaker, a MEMS speaker, and the like. The following description takes the moving coil speaker as an example. The moving coil speaker includes a vibration part and a magnetic circuit system being in cooperation with the vibration part. The cooperating manner of the vibrating part and the magnetic circuit system is common knowledge in the art, and will not be described in detail here.

In operation, the first sound production apparatus 14 and the second sound production apparatus 15 have opposite phases to create an acoustic dipole. The opposite phase means that the phase difference between the phases of the sound waves radiated by the two sound production apparatuses 14, 15 is 180°. The acoustic dipole refers to a sound source synthesized by two sound sources that are very close to each other and have the same or similar frequency and vibration amplitude as well as opposite phases.

The distances from the first sound production apparatus 14 and the second sound production apparatus 15 to the same ear hole 17 of the wearer are different.

Since the two sound production apparatuses have opposite phases, and the distance between the two is much smaller than the distance between the sound production apparatus and the surrounding people, the two sound production apparatuses create an acoustic dipole with respect to the surrounding people, Therefore, when the sound waves of the two sound production apparatuses are transmitted to the ears of surrounding people, they can at least partially cancel each other, thereby significantly reducing the sound leakage phenomenon of the sound production units.

In addition, since the two sound production apparatuses are at different distances from the same ear canal of the wearer, for example, the distance difference between the two is greater than or equal to 1 cm, the two do not create an acoustic dipole with respect to the wearer, and thus the sound waves are less attenuated near the ear hole, so that the wearer may hear the sound from the sound production unit. This arrangement of the sound production unit enhances the privacy of the wearer when listening.

Figure 2:
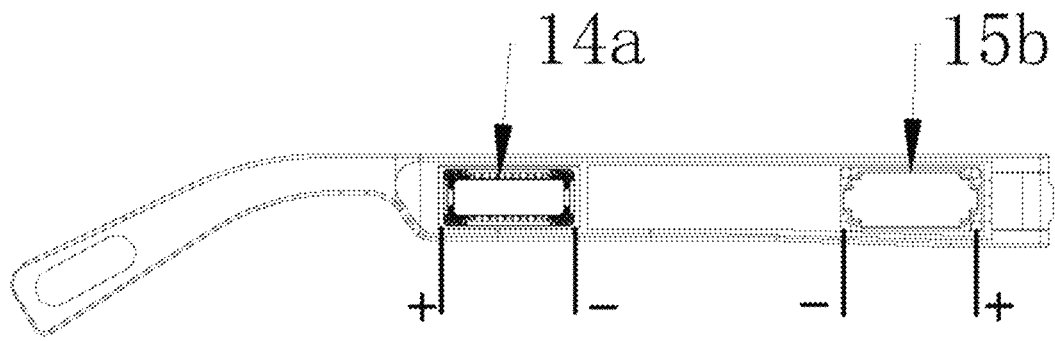
FIG. 2 shows a schematic structural diagram of an arm of the present disclosure.

In one example, as shown in FIG. 2, the first sound production apparatus 14 and the second sound production apparatus 15 respond to the same electrical signal. The first sound production apparatus 14 and the second sound production apparatus 15 have opposite polarity, and in particular, may have opposite current directions.

In this way, when vibrating, the vibrating parts of the two sound production apparatuses 14, 15 have opposite vibration directions, and at the same time, one vibrating part 14a vibrates toward the sound outlet, while the other vibrating part 15a vibrates toward the interior of the sound production apparatus, which causes the first sound production apparatus 14 and the second sound production apparatus 15 to have opposite phases.

Figure 3:
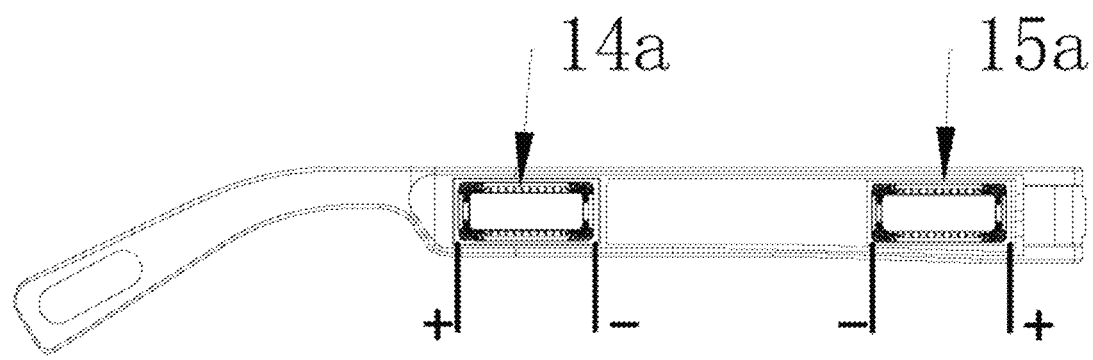
FIG. 3 shows a schematic structural diagram of another arm of the present disclosure.

In one example, as shown in FIG. 3, when installed, the first sound production apparatus 14 and the second sound production apparatus 15 have the same polarity. The polarities of the electrical signals of the first sound production apparatus 14 and the second sound production apparatus 15 are opposite. Therefore, when vibrating, the vibrating parts of the two sound production apparatuses 14 and 15 have opposite vibration directions, which causes the first sound production apparatus 14 and the second sound production apparatus 13 to have opposite phases.

It should be noted that, in this example, the sound waves radiated by the two sound production apparatuses 14 and 15 have the same or similar frequency ranges. In this way, it is easy to form the acoustic dipole by the two sound production apparatuses 14, 15. Preferably, the first sound production apparatus 14 and the second sound production apparatus 15 are of the same model. The two sound production apparatuses 14 and 15 have the same sound frequency, so that the auxiliary sound source around the wearer may significantly reduce the main sound source, and the leakage reduction effect is good.

The distance between the sound outlets of the two sound production apparatuses 14 and 15 is much smaller than the distance between the sound production apparatuses and the surrounding people. For example, the distance between the first sound production apparatus 14 and the second sound production apparatus 15 is less than or equal to 30 mm. In this example, the distance between the two sound production apparatuses 14 and 15 is much smaller than the distance between the sound production apparatuses and the surrounding people, and within this range, the sound production unit has an excellent leakage reduction effect on the surrounding people.

For example, the sound outlet of the first sound production apparatus 14 faces the ear hole 17 of the wearer, and the distance from the sound outlet of the second sound production apparatus 15 to the ear hole 17 is greater than the distance from the sound outlet of the first sound production apparatus 14 to the ear hole 17.

For the wearer, due to the need for listening, the sound outlet of one of the sound production apparatuses (for example, the first sound outlet 16 of the first sound production apparatus 14) may be close to the ear hole 17; while the sound outlet of the other sound production apparatus (for example, the second sound outlet 19 of the second sound production apparatus 15) may be placed away from the ear hole 17, so as to form a distance difference. In this way, the sound waves will not form a large attenuation at the ear hole 17 of the wearer, and thus the wearer can clearly hear the sound from the sound production unit, especially the sound from the first sound production apparatus 14.

Optionally, the difference between the distance from the sound outlet (for example, the first sound outlet 16) of the second sound production apparatus 15 to the ear hole 17 and the distance from the sound outlet (for example, the second sound outlet 19) of the first sound production apparatus 14 to the ear hole 17 is greater than or equal to 5 mm. Within this range, the effect of the second sound production apparatus 15 to weaken the sensitivity of the first sound production apparatus 14 is small at the ear hole 17, and thus the wearer can clearly hear the sound wave radiated by the sound production unit.

Figure 4:
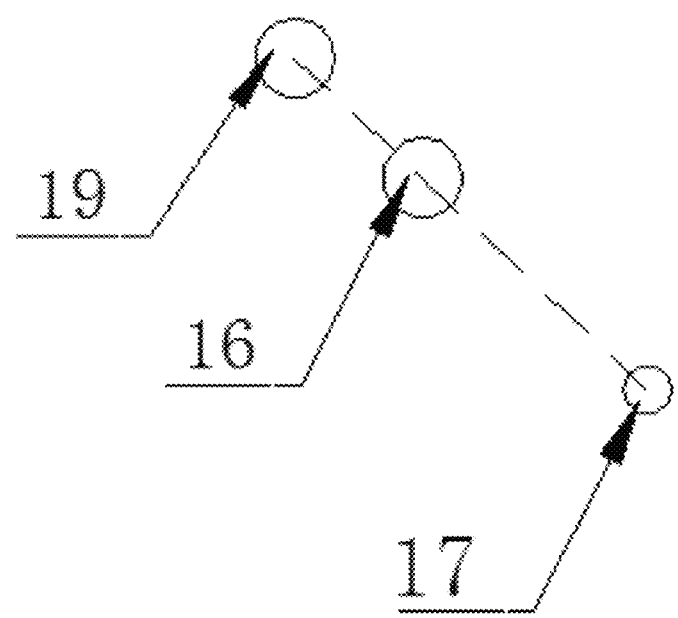
FIG. 4 is an arrangement diagram of a first sound outlet, a second sound outlet and an ear hole of the embodiment of the present disclosure.

In one example, as shown in FIG. 4, the sound outlet (for example, the first sound outlet 16) of the first sound production apparatus 14, the sound outlet (for example, the second sound outlets 19) of the second sound production apparatus 15 and the ear hole 17 are located on the same line. In this way, when the distance between the two sound outlets 16 and 19 is a predetermined value, the distance difference between the two sound outlets 16, 19 and the ear hole 17 is the largest, and the wearer may obtain a good listening effect.

In one example, as shown in FIG. 1, a cavity is provided in the arm. The sound production unit is provided in the cavity. The arm is provided with a first sound outlet 16 which is in communication with the vibrating part of the first sound production apparatus 14 and a second sound outlet 19 which is in communication the vibrating part of the second sound production apparatus 15. For example, the arm includes a shell. The above cavity is formed inside the shell. The first sound outlet 16 and the second sound outlet 19 are provided on the shell. In this example, the sound production unit is installed in a sealed manner. Compared with the open installation manner, the sound production unit may be effectively protected by the arm, and the smart head-mounted device has a good appearance.

In one example, the shell includes a main body portion and a sound outlet portion which are provided independently. For example, the main body portion and the sound outlet portion form a rectangular body as a whole. The rectangular body has a rectangular or approximately rectangular cross-section. The sound outlet portion is used to accommodate the sound production unit and constitutes a sound production module together with the sound production unit. After the sound production module is assembled and passed the test, the sound outlet portion and the main body portion are connected together. In this way, the sound production unit is of a modular design, which makes the various parts of the arm more replaceable, and reduces the defect rate.

In one example, as shown in FIG. 1, the sound outlet (for example, the first sound outlet 16) of the first sound production apparatus 14 and the sound outlet (for example, the second sound outlet 19) of the second sound production apparatus 15 have different orientations. In this way, at the ear hole 17, the second sound production apparatus 15 has a small attenuation effect on the first sound production apparatus 14 which will not affect the listening effect of the wearer.

In one example, as shown in FIG. 1, the sounding direction of the first sound production apparatus 14 is toward the ear hole 17 of the wearer, while the second sound production apparatus 15 is sounded toward the direction away from the wearer. For example, the first sound production apparatus 14 emits sound through the first sound outlet 16 of the shell, and the second sound production apparatus 15 emits sound through the second sound outlet 19 of the shell. The first sound outlet 16 points to the ear hole 17. Due to the directivity of the sound wave, especially the directivity of the mid-frequency sound wave and the high-frequency sound wave, the wearer's ear may hear the sound emitted by the first sound production apparatus 14 more clearly. The second sound outlet 19 is outwardly perpendicular to the wearer's face, so at the ear hole 17, the sound wave radiated by the second sound production apparatus 15 has a small attenuation effect on the sound wave radiated by the first sound production apparatus 14.

In one example, as shown in FIG. 1, the arm includes a connecting portion 13*a* and a bending portion 13*b* connected to one end of the connecting portion 13*a*. The connecting portion 13*a* is hinged with the lens 11 at the other end thereof. The connecting portion 13*a* is provided with a cavity therein. The connecting portion 13*a* is formed with a slope 18 towards the ear hole 17*a* at the one end connected to the bending portion 13*b*. The first sound outlet 16 is provided on the slope 18. The second sound outlet 19 is located on a lateral surface or a top surface.

For example, the connecting portion 13*a* includes the above shell enclosing the cavity. The shell is rectangular as a whole. The first sound production apparatus 14 and the second sound production apparatus 15 are provided in the cavity, and for example, the two sound production apparatuses 14, 15 are isolated from each other. The bending portion 13*b* protrudes from the upper part of one end surface of the connection portion 13*a*. The end surface forms the slope 18 at its lower part.

The shell includes two sound outlets 16, 19 which are in communication with the external space. The first sound production apparatus 14 radiates sound waves outward through the first sound outlet 16. The first sound production apparatus 16 is provided on the slope 18 so as to radiate sound waves towards the ear hole 17. The second sound production apparatus 15 radiates sound waves outward through the second sound outlet 19. The second sound outlet 19 is provided on the lateral surface of the rectangle so as to radiate sound waves outward perpendicular to the wearer's face.

In this example, since the two sound outlets 16, 19 have different orientations, the sound wave radiated by the second sound production apparatus 15 has a small attenuation effect on the sound wave radiated by the first sound production apparatus, and the smart head-mounted device has a good sound production effect.

In addition, since the sound outlet 19 radiates sound waves outward, it is possible to effectively reduce the sound around the wearer and achieve good leakage reduction.

In one example, the first sound outlet 16 extends from the slope to a lower surface of the arm. The first sound outlet 16 has a flat bar-shaped structure. For example, the first sound outlet has a width of 1 mm and a length of 8-10 mm. In this example, the first sound outlet 16 may radiate sound waves to a wide space near the ear bole, which makes the wearer's listening effect better.

The first sound production apparatus 14 is a side sounding type. Due to the adjustment effect of the front sound cavity of the first sound production apparatus, the smart head-mounted device has a good sound production effect at mid-frequency and high-frequency. The second sound outlet 19 faces the vibrating part 15a of the second sound production apparatus 15. The second sound production apparatus 15 is a positive sounding type. The second sound production apparatus 15 has high radiation efficiency and good leakage reduction effect. For example, the shape of the second sound outlet hole 19 is round and square in shape.

In other examples, the two sound production apparatuses 14, 15 protrude outward from the arm and are in opposite phases when vibrating. In this example, the two sound production apparatuses 14, 15 are provided in an open manner, which may also achieve the effect of reducing sound leakage in the wearer's surroundings.

In other examples, part of the cavity forms a rear acoustic cavity of the first sound production apparatus 14. The rear acoustic cavity is filled with sound-absorbing material, which makes the low-frequency effect of the smart head-mounted device good.

While certain specific embodiments of the present disclosure have been illustrated by way of example, it will be understood by those skilled in the art that the foregoing examples are provided for the purpose of illustration and are not intended to limit the scope of the present disclosure. It will be understood by those skilled in the art that the foregoing embodiments may be modified without departing from the scope and spirit of the disclosure. The scope of the present disclosure is subject to the attached claims.

The invention claimed is:

1. A smart head-mounted device, comprising: a lens, and an arm connected to the lens, the arm provided with a sound production unit including a first sound production apparatus and a second production apparatus, each having a sound outlet;

wherein the first sound production apparatus and the second production apparatus are configured to radiate sound waves having opposite phases outward through the respective sound outlets, and are positioned apart from a common ear hole of a wearer by different distances; and wherein the arm is provided with a cavity therein where the sound production unit is provided, and is provided thereon with a first sound outlet in communication with a vibrating part of the first sound production apparatus, and a second sound outlet in communication with a vibrating part of the second sound production apparatus; and the arm comprises a connecting portion and a bending portion connected to a first end of the connecting portion, the connecting portion is hinged with the lens at a second end thereof, is provided with a cavity therein, and is formed with a slope towards the ear hole at the first end, the first sound outlet provided on the slope, and the second sound outlet located on a lateral surface or a top surface of the connecting portion.

2. The smart head-mounted device of claim 1, wherein the sound outlet of the first sound production apparatus is oriented differently from the sound outlet of the second sound production apparatus.

3. The smart head-mounted device of claim 2, wherein the sound outlet of the first sound production apparatus is oriented towards the ear hole of the wearer, and the sound outlet of the second sound production apparatus is oriented away from the wearer.

4. The smart head-mounted device of claim 1, wherein the first sound production apparatus and the second sound production apparatus respond to a common electrical signal and have opposite polarities.

5. The smart head-mounted device of claim 1, wherein the first sound production apparatus and the second sound production apparatus have the same polarity, and have electrical signals with opposite polarities.

6. The smart head-mounted device of claim 1, wherein the first sound production apparatus and the second sound production apparatus are of the same model.

7. The smart head-mounted device of claim 1, wherein the distance between the sound outlet of the first sound production apparatus and the sound outlet of the second sound production apparatus is less than or equal to 30 mm.

8. The smart head-mounted device of claim 1, wherein the sound outlet of the first sound production apparatus is towards the ear hole of the wearer, and a distance from the sound outlet of the second sound production apparatus to the ear hole is greater than a distance from the sound outlet of the first sound production apparatus to the ear hole.

9. The smart head-mounted device of claim 8, wherein a difference between the distance from the second sound production apparatus to the ear hole and the distance from the first sound production apparatus to the ear hole is greater than or equal to 5 mm.

10. The smart head-mounted device of claim 8, wherein the sound outlet of the first sound production apparatus and the sound outlet of the second sound production apparatus are configured for positioning with the ear hole in a line.

* * * * *